Figure 1:
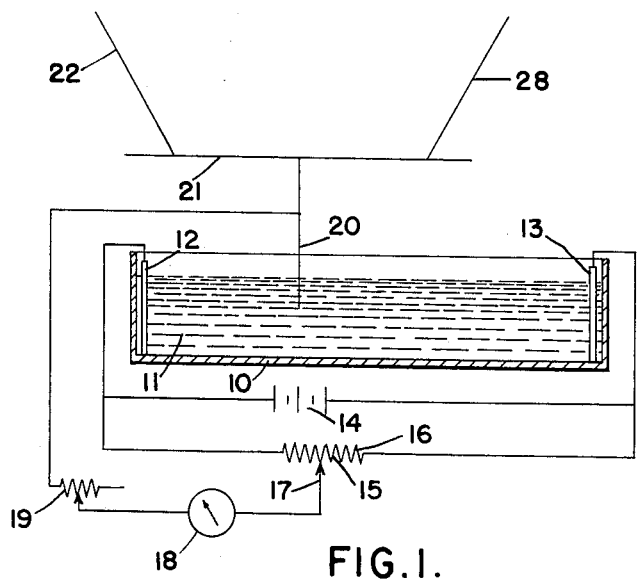

May 4, 1965   A. G. DALLAS ETAL   3,181,355
DISPLACEMENT MEASURING TRANSDUCER
Filed Nov. 14, 1962

RESISTANCE IN OHMS

INVENTOR.
ALEXANDER G. DALLAS
JOHN L. FIGGLES
BY
ATTORNEYS:

United States Patent Office 3,181,355
Patented May 4, 1965

3,181,355
DISPLACEMENT MEASURING TRANSDUCER
Alexander G. Dallas, 2034 Pratt St., Philadelphia, Pa.,
and John L. Figgles, 63 Thaliabush Lane, Levittown,
Pa.
Filed Nov. 14, 1962, Ser. No. 237,771
3 Claims. (Cl. 73—167)
(Granted under Title 35, U.S. Code (1952), sec. 266)

The invention described herein may be manufactured and used by or for the Government for governmental purposes without the payment to us of any royalty thereon.

This invention relates to transducers such as are useful in measuring the recoil or displacement of guns or other objects which are subject to abrupt or violent forces.

Heretofore such measurements have been made by visual inspection, by taking moving pictures of the object during its movement, by means of resistance devices such as rectilinear potentiometers or Heliopots, or the like. These measuring means have not been satisfactory for various reasons. The visual inspection method has the disadvantage that the view of the observer is obscured by dust and smoke and he is exposed to possible danger from a malfunction of the gun. The motion picture method has the disadvantage that the view is likely to be obscured by dust and smoke and development of the picture involves an undesirable delay. Resistance devices have the disadvantage that their friction attenuates the recoil force so that the measurement is rendered extremely inaccurate.

The displacement measuring transducer of the present invention has the advantage that its operation involves a minimum of frictional forces and its measurements are observed at a point remote from the gun. This result is achieved by means of a Wheatstone bridge having two of its legs in the form of a conductive solution, the junction of these two legs being at a movable probe which is fixed to a pendulum on which the gun or other tested object is mounted.

The invention will be better understood from the following description when considered in connection with the accompanying drawings and its scope is indicated by the appended claims.

Figure 2:
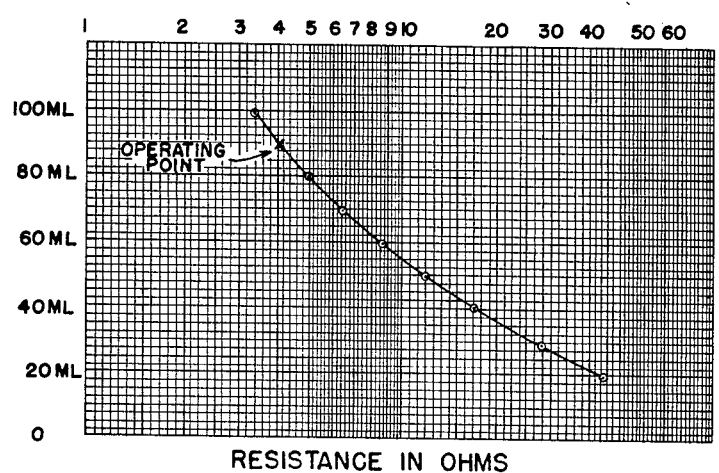

Referring to the drawings:

FIG. 1 is a view of the present displacement measuring transducer, certain parts being shown in section, and FIG. 2 is an explanatory curve relating to the solution which forms a part of the transducer.

The transducer of FIG. 1 includes a nonconductive receptacle 10 which contains a conductive solution 11 and has at its opposite ends conductive plates 12 and 13. Connected between the plates 12 and 13 are a voltage source 14 and a potentiometer 15 which includes a resistor 16 and a contact 17 movable along said resistor. The contact 17 is connected through a meter 18 and a resistor 19 to a probe 20. The probe 20 is fixed to a pendulum 21 which suspends from cables 22 and 28.

The solution 11 may consist of glycerine and salt solution. How the resistance of this solution varies with the percentage of salt solution it contains is indicated by the curve of FIG. 2 wherein resistance is plotted as a function 20 to 100 milliliters of a salt solution in 224 cubic centimeters of glycerin, the content of the salt solution being 1 gram of salt to 100 liters of water. For testing the recoil of a recoilless rifle, a suitable content of the salt solution was found to be about 90 milliliters as indicated on the curve.

In the operation of the displacement measuring transducer, the object to be tested is placed on the pendulum 21 and the contact 17 is adjusted to a point where a zero reading of the meter 18 is established. With the bridge thus balanced for zero output, any movement of the pick off arm or probe 20 longitudinally of the receptacle 10 unbalances the bridge causing a meter reading which is proportional to the extent of the movement. By suitably calibrating the meter, it may be made to read, in suitable units of distance, the displacement of the probe between the plates 12 and 13.

Advantages of the present displacement transducer are that it operates without contact bounce, has negligible off axis output, is linear from one end to the other by +.10 percent, operates with negligible friction, and is inexpensive to construct.

We claim:

1. In a displacement measuring transducer, the combination of, a pendulum, means resiliently supporting said pendulum in a predetermined position of rest for linear movement therefrom, a nonconductive vessel having conductive plates therein spaced in the line of movement of said pendulum and containing a solution having a known resistance per unit distance between said plates, a probe fixed to and movable with said pendulum and extending into said solution at a point intermediate said plates, means for applying voltage between said plates, a potentiometer connected between said plates and having a movable contact adjustable to a point where its voltage is identical with that of said probe, and means connected between said probe and said contact for measuring departure of said probe from said point.

2. In a displacement measuring transducer, the combination as defined in claim 1, wherein the means connected between the probe and the contact for measuring departure of the probe from the said point includes an electrical meter calibrated to read said departure in units of distance between said plates.

3. In a displacement measuring transducer for gun recoil and like abruptly-generated forces, the combination of, a cable-suspended pendulum element adapted to receive and support an object to be tested, said pendulum element having an electrical probe connected and movable therewith linearly from a position of rest, means providing a body of electricaly-conductive solution with spaced electrodes therein between which said probe moves in response to shock movement of said pendulum element, means connected to apply a polarizing voltage to said electrodes for current flow through said body of solution, a potentiometer resistor connected between said electrodes and having a movable intermediate contact between its ends, an electrical meter connected between said probe and said movable contact, said meter being calibrated to read the amount of departure of said probe from said position of rest, and a control resistor connected serially in circuit with said meter between said probe and said contact.

References Cited by the Examiner
UNITED STATES PATENTS 1,027,755   5/12   Pickard _____ 338—83 X
2,397,962   4/46   Hartz _____ 338—27
2,642,741   6/53   Du Pont _____ 73—167

FOREIGN PATENTS 864,550   1/41   France.

RICHARD C. QUEISSER, Primary Examiner.